US011286378B2

(12) United States Patent
Suchao-In et al.

(10) Patent No.: US 11,286,378 B2
(45) Date of Patent: *Mar. 29, 2022

(54) MULTIMODAL POLYETHYLENE PIPE

(71) Applicants: Thai Polyethylene Co., Ltd., Bangkok (TH); SCG Chemicals Co., Ltd., Bangkok (TH)

(72) Inventors: Natthaporn Suchao-In, Bangkok (TH); Warachad Klomkamol, Bangkok (TH)

(73) Assignees: Thai Polyethylene Co., Ltd., Bangkok (TH); SCG Chemicals Co., Ltd., Bangkok (TH)

( * ) Notice: Subject to any disclaimer, the term of this patent is extended or adjusted under 35 U.S.C. 154(b) by 62 days.

This patent is subject to a terminal disclaimer.

(21) Appl. No.: 16/332,020

(22) PCT Filed: Sep. 7, 2017

(86) PCT No.: PCT/EP2017/072485
§ 371 (c)(1),
(2) Date: Mar. 11, 2019

(87) PCT Pub. No.: WO2018/046608
PCT Pub. Date: Mar. 15, 2018

(65) Prior Publication Data
US 2020/0056023 A1   Feb. 20, 2020

(30) Foreign Application Priority Data

Sep. 12, 2016  (EP) .................................... 16188322

(51) Int. Cl.
| C08L 23/08 | (2006.01) |
| C08F 110/02 | (2006.01) |
| C08F 2/18 | (2006.01) |
| C08F 2/01 | (2006.01) |
| C08F 2/38 | (2006.01) |
| C08F 210/16 | (2006.01) |
| F16L 9/12 | (2006.01) |

(52) U.S. Cl.
CPC ............ *C08L 23/0815* (2013.01); *C08F 2/01* (2013.01); *C08F 2/18* (2013.01); *C08F 2/38* (2013.01); *C08F 110/02* (2013.01); *C08F 210/16* (2013.01); *F16L 9/12* (2013.01); *B01J 2219/0004* (2013.01); *C08L 2203/18* (2013.01); *C08L 2205/025* (2013.01); *C08L 2207/068* (2013.01); *C08L 2314/02* (2013.01); *C08L 2314/06* (2013.01)

(58) Field of Classification Search
CPC ............ C08L 23/0815; C08L 2203/18; C08L 2205/025; C08L 2207/068; C08L 2314/02; C08L 2314/06; C08L 23/06; C08F 2/01; C08F 2/18; C08F 2/38; C08F 110/02; C08F 210/16; C08F 2/12; C08F 2/00; C08F 10/02; C08F 2500/05; C08F 2500/07; C08F 2500/08; C08F 2500/18; F16L 9/12; B01J 2219/0004; B01J 8/22; B01J 8/008
See application file for complete search history.

(56) References Cited

U.S. PATENT DOCUMENTS

| 6,291,601 | B1 | 9/2001 | Debras |
| 6,713,561 | B1 | 3/2004 | Berthold et al. |
| 6,716,936 | B1 | 4/2004 | McGrath et al. |
| 8,759,448 | B2 | 6/2014 | Buryak et al. |
| 8,802,768 | B2 | 8/2014 | Dotsch et al. |
| 2003/0191251 | A1 | 10/2003 | McGrath |
| 2004/0204542 | A1 | 10/2004 | Mattioli et al. |
| 2006/0074194 | A1 | 4/2006 | Berthold et al. |
| 2009/0105422 | A1 | 4/2009 | Berthold et al. |
| 2009/0163679 | A1 | 6/2009 | Do Nascimento et al. |
| 2009/0304966 | A1 | 12/2009 | Mehta et al. |
| 2010/0010163 | A1 | 1/2010 | Berthold et al. |
| 2010/0016526 | A1 | 1/2010 | Etherton et al. |
| 2010/0035008 | A1 | 2/2010 | Backman |
| 2010/0076136 | A1* | 3/2010 | Vogt ...................... C08F 210/16 524/377 |
| 2010/0092709 | A1 | 4/2010 | Joseph |
| 2010/0152383 | A1 | 6/2010 | Jiang et al. |
| 2010/0301054 | A1 | 12/2010 | Berthold et al. |
| 2013/0237652 | A1* | 9/2013 | Kulshreshtha et al. ..................... B29C 45/0001 524/232 |

(Continued)

FOREIGN PATENT DOCUMENTS

| EP | 1041113 A1 | 10/2000 |
| EP | 1201713 A1 | 5/2002 |

(Continued)

OTHER PUBLICATIONS https://en.wikipedia.org/wiki/Ultra-high-molecular-weight_polyethylene (Year: 2020).*
Dec. 1, 2017—ISR and WO PCT/EP2017/072485.

*Primary Examiner* — Irina S Zemel
(74) *Attorney, Agent, or Firm* — Banner & Witcoff, Ltd.

(57) ABSTRACT

The present invention relates to a reactor system for a multimodal polyethylene polymerization process, comprising: (a) first reactor; (b) a hydrogen removal unit arranged between the first reactor and a second reactor comprising at least one vessel connected with a depressurization equipment, preferably selected, from vacuum pump, compressor, blower, ejector or a combination thereof, the depressurization equipment allowing to adjust an operating pressure to a pressure in a range of 100-200 kPa (abs); (c) the second reactor; and (d) a third reactor and use thereof as a pipe.

12 Claims, No Drawings

(56) References Cited

U.S. PATENT DOCUMENTS

| | | |
|---|---|---|
| 2014/0030460 A1 | 1/2014 | Monoi et al. |
| 2014/0256883 A1* | 9/2014 | Michie, Jr. et al. .... C08L 23/06 525/240 |
| 2015/0051364 A1 | 2/2015 | Vahteri et al. |
| 2016/0333172 A1* | 11/2016 | Koch et al. ......... C08L 23/0807 |
| 2018/0022905 A1* | 1/2018 | Buryak et al. ...... C08L 23/0815 525/240 |
| 2019/0092918 A1* | 3/2019 | Sun et al. .............. C08J 9/0061 |
| 2019/0225714 A1* | 7/2019 | Jarumaneeroj ....... C08F 210/16 |
| 2019/0330390 A1* | 10/2019 | Mattayan ................ B01J 19/245 |
| 2019/0359738 A1* | 11/2019 | Suk-Em et al. ........... C08F 2/18 |
| 2019/0359741 A1* | 11/2019 | Suchao-In et al. .......................... B01D 19/0036 |
| 2019/0374919 A1* | 12/2019 | Traisilanun ............ C08F 110/02 |
| 2020/0056021 A1* | 2/2020 | Mattayan ................ C08F 10/02 |
| 2020/0056022 A1* | 2/2020 | Mattayan et al. ...... C08L 23/06 |
| 2020/0079938 A1* | 3/2020 | Traisilanun et al. .... B01J 8/008 |
| 2020/0095404 A1* | 3/2020 | Jarumaneeroj et al. .................... C08L 23/04 |

FOREIGN PATENT DOCUMENTS

| | | | | |
|---|---|---|---|---|
| EP | 1460105 A1 | 9/2004 | | |
| EP | 1417260 B1 | 8/2005 | | |
| EP | 1578862 B1 | 9/2005 | | |
| EP | 1655334 A1 | 5/2006 | | |
| EP | 1576047 B1 | 7/2006 | | |
| EP | 1576049 B1 | 7/2006 | | |
| EP | 2017302 A1 | 1/2009 | | |
| EP | 2072586 A1 * | 6/2009 | ........... | C09D 123/06 |
| EP | 2130863 A1 | 12/2009 | | |
| EP | 2354184 A1 | 8/2011 | | |
| EP | 2407506 A1 | 1/2012 | | |
| EP | 2365995 B1 | 12/2012 | | |
| EP | 2743305 A1 | 6/2014 | | |
| EP | 2668231 B1 | 10/2014 | | |
| EP | 2907843 A1 | 8/2015 | | |
| HU | 0800771 A2 | 10/2010 | | |
| JP | 2012-067914 A | 4/2012 | | |
| WO | 9618677 A1 | 6/1996 | | |
| WO | 2004056921 A1 | 7/2004 | | |
| WO | 2006092377 A1 | 9/2006 | | |
| WO | 2006092378 A1 | 9/2006 | | |
| WO | 2006092379 A1 | 9/2006 | | |
| WO | 2007003530 A1 | 1/2007 | | |
| WO | 2007042216 A1 | 4/2007 | | |
| WO | 2007045415 A1 | 4/2007 | | |
| WO | 2008006487 A1 | 1/2008 | | |
| WO | 2008049551 A1 | 5/2008 | | |
| WO | 2008131817 A1 | 11/2008 | | |
| WO | 2009003627 A1 | 1/2009 | | |
| WO | 2009077142 A1 | 6/2009 | | |
| WO | 2009147022 A1 | 12/2009 | | |
| WO | 2010025342 A2 | 3/2010 | | |
| WO | 2012/069400 A1 | 5/2012 | | |
| WO | 2013101767 A2 | 7/2013 | | |
| WO | 2013113797 A1 | 8/2013 | | |
| WO | 2013144324 A1 | 10/2013 | | |
| WO | 2013144328 A1 | 10/2013 | | |
| WO | 2014091501 A1 | 6/2014 | | |
| WO | 2015121161 A1 | 8/2015 | | |

* cited by examiner

MULTIMODAL POLYETHYLENE PIPE

CROSS-REFERENCE TO RELATED APPLICATIONS

This application is a U.S. National Stage application under 35 U.S.C. § 371 of International Application PCT/EP2017/072485 (published as WO 2018/046608 A1), filed Sep. 7, 2017, which claims the benefit of priority to Application EP 16188322.8, filed Sep. 12, 2016. Benefit of the filing date of each of these prior applications is hereby claimed. Each of these prior applications is hereby incorporated by reference in its entirety.

The present invention relates to a reactor system for a multimodal polyethylene polymerization process, a process for producing a multimodal polyethylene composition using said reactor system, including a pipe comprising said multimodal polyethylene composition and the use thereof.

The demand of polyethylene resins is increasingly being used in a variety of applications. As required high performance of polyethylene for a relatively new plastic, a polymerization process technology has been developed to support new polymeric material production. In order for balancing processability and physical properties of ethylene copolymers, the development in multimodal polymerization process has been investigated.

In the prior art, multimodal polyethylene polymerization is employed to produce polymers having different molecular weights by creating each resin fraction in separated reactors. A low molecular weight fraction is produced in a reactor using an excess of hydrogen to control the molecular weight of the polymer suitable for providing good processability of the final polymer. A high molecular weight fraction which has an influence on the physical properties and is produced under polymerization conditions with low hydrogen concentration. It is well known in the art that low molecular weight polymer is preferably produced in a first reactor. To obtain a multimodal polymer with good physical properties, all hydrogen from the first reactor should be removed before the polymerized slurry polymer is passed to a second reactor in which the production of high molecular weight polymer takes place.

US2010/0092709 A1 describes a process for preparing bimodal polyethylene copolymers. The polymerization in a second reactor is operated at a high temperature with a low comonomer-to-ethylene-ratio and low hydrogen-to-ethylene-ratio to obtain resins having improved stress crack resistance and melt strength.

U.S. Pat. No. 6,716,936 B1 describes a process for producing bimodal polyethylene copolymers. A second reactor is operated under hydrogen depleted polyethylene polymerization by directing a polyethylene slurry stream from a first reactor to a hydrogen removal system. Polymerization in both the first and the second reactors is operated at the bubble point by using propane or isobutane as a light solvent. The process is suitable for the production of a bimodal polyethylene for highly homogeneous high molecular weight resins.

U.S. Pat. No. 6,291,601 B1 describes a process for producing a bimodal copolymer with relatively high molecular weight polyethylene. A hydrogenation catalyst is introduced into a second reactor to consume residual hydrogen gas from first reactor by converting hydrogen into ethane leading to a low hydrogen concentration in the second reactor. Using this technique, the cost of raw material consumption of both hydrogen and ethylene are increased due to converting of unreacted gases.

US 2003/0191251 A1 discloses a process for removing residual hydrogen from a polymer slurry by using two flash drums placed between cascade reactors which use light solvent as a diluent. The addition of make-up solvent to the first flash drum outlet is required to prevent a slurry transfer pump blocking. Furthermore, warm make-up solvent is necessary before transferring slurry into the next flash drum.

EP 1 655 334 A1 discloses the multimodal production of an ethylene polymer which is produced in a multistage process with a $MgCl_2$-based Ziegler-Natta catalyst. The polymerization stages are performed in the following order to achieve firstly a ultra high molecular weight polymer, followed by achieving a low molecular weight polymer, and finally achieving high molecular weight polymer in the last step. The polymerization catalyst is charged to a prepolymerization step to make an ultrahigh molecular weight fraction.

WO 2013/144328 describes a composition of multimodal high density polyethylene which is produced using a Ziegler-Natta catalyst for use in molding applications. A small fraction of ultra-high polyethylene of less than 15% by weight is produced in a third reactor.

US 2009/0105422 A1 describes a process for producing a multimodal polyethylene. The polymerization is carried out in three cascade reactors, wherein the molecular weight of the polymer in each reactor is controlled by the presence of hydrogen. The concentration of the hydrogen in each reactor is reduced subsequently by providing the highest hydrogen concentration in the first reactor and the lowest hydrogen concentration in the third reactor.

WO 2013/113797 describes a process for polyethylene preparation comprising three main subsequent steps of polymerized ethylene and at least one other α-olefin to get the polyethylene with, respectively, a lower molecular weight ethylene polymer, a first higher molecular weight ethylene polymer and a second higher molecular weight ethylene polymer in accordance with the sequence of a first reactor, a second reactor and a third reactor.

Even though many processes for preparing multimodal polyethylene are known and have been described, there is still a need for developing new processes for multimodal polymerization, particularly for further improving the mechanical properties of polyethylene compositions.

Therefore, it is the object of the present invention to provide a reactor system and a process for preparing multimodal polyethylenes overcoming drawbacks of the prior art, in particular to enhance the performance of a hydrogen removal unit comprised in such a reactor.

It is a further object to provide a multimodal polyethylene composition overcoming drawbacks of the prior art, in particular having improved mechanical properties, such as Charpy impact strength.

A variety of polyethylene based pipes is well known in the art. The major end-use performance requirements of the polyethylene pipe are long-term hydrostatic strength, which determines the pressure rating, slow crack growth (SCG) resistance, and rapid crack propagation (RCP) resistance. With respect to the polymer properties, the higher the density of the polyethylene, the higher will be the long term hydrostatic strength. In order to improve the stress cracking resistance of a polyethylene pipe, the increasing of molecular weight or decreasing density of the polymer should be focused. When the density is decreased, the rigidity of the polyethylene is unfavorably deteriorated.

It is quite challenge to develop polyethylene for the manufacture of pipes with the balance of properties, e.g.

improved SCG without negatively affecting RCP and pressure resistance as well as processability from these contrary parameters.

WO 2013/113797 A1 discloses a multimodal polyethylene polymer and a process for preparing said polymer.

EP 2 354 184 A1 discloses a polyethylene moulding composition having a multimodal weight distribution and dealing with stress crack/stiffness, relationship and impact resistance.

WO 2009/147022 A1 is related to a high density polymer composition, a method for the preparation thereof and pipes made therefrom. The composition comprises a multimodal copolymer of ethylene and α-olefin.

EP 2 017 302 A1 refers to a moulded article comprising high density polyethylene copolymer which comprises a multimodal high density ethylene-hexene copolymer further containing at least one lower molecular weight polyethylene homopolymer component.

WO 2007/045415 A1 is related to a polyethylene composition comprising at least a first composition and a second composition wherein the composition comprises a low molecular weight polyethylene and a high molecular weight polyethylene which may both be selected as a homo- or copolymer.

WO 2008/131817 A1 is related to a pipe or a related article comprising a multimodal polyethylene composition.

JP 2012-067914 A is related to a polymer pipe formed by a multimodal polymer composition and deals with improved stress resistance.

It is, in light of the prior art, the object of the invention to provide polyethylene pipes overcoming drawbacks of the prior art, in particular having characteristics of an impact resistance sufficient to endure impacts during installation and long term use including excellent long term durability under gas or water pressure determined by slow crack growth (SCG) resistance.

This object is achieved in accordance with the invention according to the subject-matter of the independent claims. Preferred embodiments result from the sub-claims.

This object of the art is achieved in accordance with the invention according to the subject-matter of the independent claims. Preferred embodiments result from the sub-claims.

The object is first of all achieved by a reactor system for a multimodal polyethylene polymerization process, comprising;
(a) a first reactor;
(b) a hydrogen removal unit arranged between the first reactor and a second reactor comprising at least one vessel connected with a depressurization equipment, preferably selected from vacuum pump, compressor, blower, ejector or a combination thereof, the depressurization equipment allowing to adjust an operating pressure to a pressure in a range of 100-200 kPa (abs);
(c) the second reactor; and
(d) a third reactor.

Preferably, the depressurization equipment allows to adjust the operating pressure in the hydrogen removal unit to a pressure in the range of 103-145 kPa (abs), preferably 104-130 kPa (abs), most preferably 105 to 115 kPa (abs)

Preferably, the hydrogen removal unit further contains a stripping column for the separation of hydrogen and a liquid diluent.

The object is further achieved by a process for producing a multimodal polyethylene composition in an inventive reactor system, comprising (in this sequence);
(a) polymerizing ethylene in an inert hydrocarbon medium in the first reactor in the presence of a catalyst system, selected from Ziegler-Natta catalyst or metallocene, and hydrogen in an amount of 0.1-95% by mol with respect to the total gas present in the vapor phase in the first reactor to obtain a low molecular weight polyethylene having a weight average molecular weight (Mw) of 20,000 to 90,000 g/mol or medium molecular weight polyethylene having a weight average molecular weight (Mw) of more than 90,000 to 150,000 g/mol wherein the low molecular weight polyethylene, respectively the medium molecular weight polyethylene, has a density at least 0.965 g/cm3, and the low molecular weight polyethylene has MI2 in the range from 10 to 1,000 g/10 min and the medium molecular weight polyethylene has MI2 in the range from 0.1 to 10 g/10 min;

(b) removing in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;

(c) polymerizing ethylene and optionally C4 to C12 α-olefin comonomer in the second reactor in the presence of a catalyst system, selected from Ziegler-Natta catalyst or metallocene, and in the presence of hydrogen in an amount obtained in step (b) to obtain a first high molecular weight polyethylene having a weight average molecular weight (Mw) of more than 150,000 to 1,000,000 g/mol or a first ultra high molecular weight polyethylene having a weight average molecular weight (Mw) of more than 1,000,000 to 5,000,000 g/mol in the form of a homopolymer or a copolymer and transferring a resultant mixture to the third reactor; and (d) polymerizing ethylene, and optionally C4 to C12 α-olefin comonomer in the third reactor in the presence of a catalyst system, selected from Ziegler-Natta catalyst or metallocene, and hydrogen, wherein the amount of hydrogen in the third reactor is in a range of 0.1-70% by mol, preferably 0.1-60% by mol with respect to the total gas present in the vapor phase in the third reactor or optionally substantial absence of hydrogen to obtain a second high molecular weight polyethylene having a weight average molecular weight (Mw) of more than 150,000 to 1,000,000 g/mol or a second ultra high molecular weight polyethylene homopolymer or copolymer having a weight average molecular weight (Mw) of more than 1,000,000 to 5,000,000 g/mol.

"Substantially absence" in this regard means that hydrogen is only comprised in the third reactor in an amount which cannot be avoided by technical means.

The slurry mixture obtained from the first reactor and subjected to the step of removing hydrogen in the hydrogen removal unit contains all of the solid and liquid constituents obtained in the first reactor, in particular the low molecular weight polyethylene or the medium molecular weight polyethylene. Furthermore, the slurry mixture obtained from the first reactor is saturated with hydrogen regardless the amount of hydrogen used in the first reactor.

Preferably, the removing is removing of 98.0 to 99.8% by weight of the hydrogen, and more preferable 98.0 to 99.5% by weight, most preferred 98.0 to 99.1% by weight.

Preferably, the operation pressure of the hydrogen removal unit is in the range of 103-145 kPa (abs) and more preferably 104-130 kPa (abs), most preferred 105 to 115 kPa (abs).

Preferably, step (a) results in the low molecular weight polyethylene or medium molecular weight polyethylene, step (c) results in high molecular weight polyethylene or the ultra high molecular weight polyethylene, and step (d)

results in high molecular weight polyethylene or the ultra high molecular weight polyethylene.

The weight average molecular weight (Mw) of the low molecular weight polyethylene, the medium molecular weight polyethylene, the high molecular weight polyethylene and the ultra high molecular weight polyethylene described herein are in the range of 20,000-90,000 g/mol (low), more than 90,000-150,000 g/mol (medium), more than 150,000-1,000,000 g/mol (high) and more than 1,000,000-5,000,000 g/mol (ultra high) respectively.

Furthermore, the object is achieved by a multimodal polyethylene composition obtainable by a process according to any one of claims 4 to 6, comprising;

(A) 30 to 65, preferably 51 to 58 parts by weight of the low molecular weight polyethylene having a weight average molecular weight (Mw) of 20,000 to 90,000 g/mol;

(B) 5 to 40, preferably 12 to 21 parts by weight of the first high molecular weight polyethylene having a weight average molecular weight (Mw) of more than 150,000 to 1,000,000 g/mol or the first ultra high molecular weight polyethylene having a weight average molecular weight (Mw) of more than 1,000,000 to 5,000,000 g/mol; and (C) 10 to 60, preferably 27 to 33 parts by weight of the second high molecular weight polyethylene having a weight average molecular weight (Mw) of more than 150,000 to 1,000,000 g/mol or the second ultra high molecular weight polyethylene having a weight average molecular weight (Mw) of more than 1,000,000 to 5,000,000 g/mol. The object is further achieved by a multimodal polyethylene composition comprising:

(A) 51 to 58 parts by weight of a low molecular weight polyethylene or a medium molecular weight polyethylene;

(B) 12 to 21 parts by weight of a first high molecular weight polyethylene or a first ultra high molecular weight polyethylene; and (C) 27 to 33 parts by weight of a second high molecular weight polyethylene or a second ultra high molecular weight polyethylene copolymer.

Preferably, a ratio Mw/Mn of the weight average molecular weight Mw of the multimodal polyethylene composition to the number average molecular weight Mn of the multimodal polyethylene composition is less than 10 to 60, preferably 10 to 23, more preferably from 15 to 22.

Preferably, the ratio is from 17 to 22, preferably from 18 to 22, preferably from 19 to 22, preferably from 19.59 to 21.24.

In a preferred embodiment, the multimodal polyethylene composition has a weight average molecular weight from 80,000 to 1,300,000 g/mol, preferably 200,000 to 500,000 g/mol, more preferably 200,000 to 300,000 g/mol, measured by Gel Permeation Chromatography.

Furthermore, it is preferred, that the multimodal polyethylene composition has a number average molecular weight from 5,000 to 30,000 g/mol, preferably 10,000 to 25,000 g/mol, more preferably 10,000 to 15,000 g/mol measured by Gel Permeation Chromatography.

Preferably, the multimodal polyethylene composition has a Z average molecular weight from 1,000,000 to 6,000,000 g/mol, preferably 1,500,000 to 4,000,000 g/mol, more preferably 1,500,000 to 3,000,000 g/mol, measured by Gel Permeation Chromatography.

Preferably, the multimodal polyethylene composition has a density 0.945 to 0.965 g/cm$^3$, preferably 0.958 to 0.963 g/cm3 according to ISO 1183 and/or a melt flow index MI$_5$ from 0.1 to 60 g/10 min, preferably 0.1 to 0.4 g/10 min preferably from 0.15 to 0.3 g/10 min.

Preferably, the melt flow index MI$_5$ is from 0.15 to 0.3 g/10 min, preferably from 0.20 to 0.25 g/10 min, preferably from 0.20 to 0.23 g/10 min, preferably from 0.21 to 0.22 g/10 min.

Preferably, the total comonomer content with respect to the total amount of monomer units comprised in the low molecular weight polyethylene, the ultra high molecular weight polyethylene and the high molecular weight polyethylene is from 0.5 to 5% mol, preferably 1 to 3% mol.

The object is further achieved by a pipe comprising the inventive multimodal polyethylene composition.

Finally, the object is achieved by the use of the inventive pipe for applications under a pressure of at least 10.0 MPa or under atmospheric pressure.

In preferred embodiments of the inventive reactor system, the inventive process, the inventive multimodal polyethylene composition, the inventive pipe and the inventive use "comprising" is "consisting of".

In preferred embodiments "parts by weight" is "percent by weight".

The above embodiments mentioned to be preferred resulted in even more improved mechanical properties of the obtained multimodal polyethylene composition. Best results were achieved by combining two or more of the above preferred embodiments. Likewise, the embodiments mentioned above to be more or most preferred resulted in the best improvement of mechanical properties.

Surprisingly, it was found by the inventors that the above process, the above multimodal polyethylene composition and a pipe prepared therefrom solve the above mentioned objects. The inventors have surprisingly found that controlling the comonomer distribution and crystal structure of the polymer by controlling hydrogen and comonomer content in the second reactor improve the impact resistance and a high slow crack growth (SCG) of a polyethylene pipe prepared from the inventive composition.

The invention concerns a reactor system for multimodal polyethylene polymerization. The system comprises a first reactor, a second reactor, a third reactor and a hydrogen removal unit placed between the first reactor and the second reactor.

The hydrogen depleted polyethylene from the first reactor affects the polymerization of high molecular weight in the subsequent reactors. In particular, high molecular weight leads to improved mechanical properties of polyethylene that is the advantage for various product application includes injection molding, blow molding and extrusion. The catalyst for producing the multimodal polyethylene resin of this invention is selected from a Ziegler-Natta catalyst, a single site catalyst including metallocene-bases catalyst and non-metallocene-bases catalyst or chromium based might be used, preferably conventional Ziegler-Natta catalyst or single site catalyst. The catalyst is typically used together with cocatalysts which are well known in the art.

Inert hydrocarbon is preferably aliphatic hydrocarbon including hexane, isohexane, heptane, isobutane. Preferably, hexane (most preferred n-hexane) is used. Coordination catalyst, ethylene, hydrogen and optionally α-olefin comonomer are polymerized in the first reactor. The entire product obtained from the first reactor is then transferred to the hydrogen removal unit to remove 98.0 to 99.8% by weight of hydrogen, unreacted gas and some volatiles before being fed to the second reactor to continue the polymerization. The polyethylene obtained from the second reactor is a bimodal polyethylene which is the combination of the product obtained from the first reactor and that of the second reactor. This bimodal polyethylene is then fed to the third reactor to continue the polymerization. The final multimodal (trimodal) polyethylene obtained from the third reactor is the mixture of the polymers from the first, the second and the third reactor.

The polymerization in the first, the second and the third reactor is conducted under different process conditions. As a result, the polyethylene obtained in each reactor has a different molecular weight. Preferably, low molecular weight polyethylene or medium molecular weight polyethylene is produced in the first reactor, while high molecular weight polyethylene or ultra high molecular weight polyethylene is produced in the second and third reactor respectively.

The term first reactor refers to the stage where the low molecular weight polyethylene (LMW) or the medium molecular weight polyethylene (MMW) is produced. The term second reactor refers to the stage where the first high or ultra high molecular weight polyethylene (HMW1) is produced. The term third reactor refers to the stage where the second high molecular weight polyethylene or ultra high molecular weight (HMW2) is produced.

The term LMW refers to the low molecular weight polyethylene polymer polymerized in the first reactor having a weight average molecular weight (Mw) of 20,000-90,000 g/mol.

The term MMW refers to the medium molecular weight polyethylene polymer polymerized in the first reactor having a weight average molecular weight (Mw) of more than 90,000-150,000 g/mol.

The term HMW1 refers to the high or ultra high molecular weight polyethylene polymer polymerized in the second reactor having a weight average molecular weight (Mw) of more than 150,000 to 5,000,000 g/mol.

The term HMW2 refers to the high or ultra high molecular weight polyethylene polymer polymerized in the third reactor having the weight average molecular weight (Mw) of more than 150,000 to 5,000,000 g/mol.

The LMW or MMW is produced in the first reactor in the absence of comonomer in order to obtain a homopolymer.

To obtain the improved polyethylene properties of this invention, ethylene is polymerized in the first reactor in the absence of comonomer in order to obtain high density LMW polyethylene or MMW polyethylene having density≥0.965 g/cm$^3$ and MI$_2$ in the range of 5-1000 g/10 min for LMW and 1-10 g/10 min for MMW. In order to obtain the target density and MI in the first reactor, the polymerization conditions are controlled and adjusted. The temperature in the first reactor ranges from 70-90° C., preferably 80-85° C. Hydrogen is fed to the first reactor so as to control the molecular weight of the polyethylene. The molar ratio of hydrogen to ethylene in the vapor phase can be varied depending up on the target MI. However, the preferred molar ratio ranges from 0.01-8.0, more preferably 0.01-6.0. The first reactor is operated at pressure between 250 and 900 kPa, preferably 400-850 kPa. An amount of hydrogen present in the vapor phase of the first reactor is in the range of 0.1-95% by mole, preferably 0.1-90% by mol.

Before being fed to the second reactor, the slurry obtained from the first reactor containing LMW or MMW polyethylene preferably in hexane is transferred to a hydrogen removal unit which may have a flash drum connected with depressurization equipment preferably including one or the combination of vacuum pump, compressor, blower and ejector where the pressure in the flash drum is reduced so that volatile, unreacted gas, and hydrogen are removed from the slurry stream. The operating pressure of the hydrogen removal unit typically ranges from 103-145 kPa (abs), preferably 104-130 kPa (abs) in which 98.0 to 99.8% by weight of hydrogen can be removed, preferably 98.0 to 99.5% by weight and most preferred 98.0 to 99.1% by weight.

In this invention, when 98.0 to 99.8% by weight of hydrogen is removed and the polymerization undergoes under these conditions of hydrogen content, very high molecular weight polymer can be achieved this way and Charpy impact strength and Flexural modulus are improved. It was surprisingly found that working outside the range of 98.0 to 99.8% by weight of hydrogen removal, the inventive effect of obtaining very high molecular weight polymer and improving Charpy Impact an Flexural Modulus could not be observed to the same extend. The effect was more pronounced in the ranges mentioned to be preferred.

The polymerization conditions of the second reactor are notably different from that of the first reactor. The temperature in the second reactor ranges from 68-90° C., preferably 68-80° C. The molar ratio of hydrogen to ethylene is not controlled in this reactor since hydrogen is not fed into the second reactor. Hydrogen in the second reactor is the hydrogen left over from the first reactor that remains in slurry stream after being flashed at the hydrogen removal unit. Polymerization pressure in the second reactor ranges from 100-3000 kPa, preferably 150-900 kPa, more preferably 150-400 kPa.

Hydrogen removal is the comparison result of the amount of the hydrogen present in the slurry mixture before and after passing through the hydrogen removal unit. The calculation of hydrogen removal is performed according to the measurement of gas composition in the first and the second reactor by gas chromatography.

After the substantial amount of hydrogen is removed to achieve the inventive concentration, slurry from the hydrogen removal unit is transferred to the second reactor to continue the polymerization. In this reactor, ethylene can be polymerized with or without α-olefin comonomer to form HMW1 polyethylene in the presence of the LMW polyethylene or MMW polyethylene obtained from the first reactor. The α-olefin comomer that is useful for the copolymerization includes $C_{4-12}$, preferably 1-butene and 1-hexene.

After the polymerization in the second reactor, the slurry obtained is transferred to the third reactor to continue the polymerization.

The HMW2 is produced in the third reactor by polymerizing ethylene with optionally α-olefin comonomer at the presence of LMW or MMW and HMW1 obtained from the first and second reactor. The α-olefin comonomer that is useful for the copolymerization include $C_{4-12}$, preferably 1-butene and 1-hexene.

In order to obtain the target Density and the target MI in the third reactor, the polymerization conditions are controlled and adjusted. However, the polymerization conditions of the third reactor are notably different from the first and second reactor. The temperature in the third reactor ranges from 68-90° C. preferably 68-80° C. Hydrogen is optionally fed to the third reactor so as to control the molecular weight of polyethylene. The molar ratio of hydrogen to ethylene can be varied depending up on the target MI. However, the preferred molar ratio ranges from 0.01-2.0. Polymerization pressure in the third reactor ranges from 250-900 kPa, preferably 250-600 kPa, and is controlled by the addition of inert gas such as nitrogen.

The amount of LMW or MMW present in the multimodal polyethylene composition of the present invention is 30-65 parts by weight. HMW1 present in the polyethylene of the present invention is 5-40 parts by weight and HMW2 present in the polyethylene of the present invention is 10-60 parts by weight. It is possible that HMW1>HMW2 or HMW1<HMW2 depending on the polymerization conditions employed.

The final (free-flow) multimodal polyethylene composition is obtained by separating hexane from the slurry discharged from the third reactor.

The resultant polyethylene powder may then be mixed with antioxidants and optionally additives before being extruded and granulated into pellets.

Definitions and Measurement Methods $MI_2$, $MI_5$, $MI_{21}{}^a$: Melt flow index (MI) of polyethylene was measured according to ASTM D 1238 and indicated in g/10 min that determines the flowability of polymer under testing condition at 190° C. with load 2.16 kg, 5 kg and 21.6 kg, respectively.

$MI_5{}^b$: Melt flow index (MI) is determined according to ISO1133 at 190° C. and is indicated in g/10 min. The load under the melt flow rate is determined and indicated as a subscript, $MI_5$ is measured under 5 kg load.

Density$^a$: Density of polyethylene was measured by observing the level to which a pellet sinks in a liquid column gradient tube, in comparison with standards of known density. This method is determination of the solid plastic after annealing at 120° C. follow ASTM D 1505.

Density$^b$: Density is measured according to ISO 1183 and showed in g/cm$^3$ unit.

Molecular weight and Polydispersity index (PDI): The weight average molecular weight (Mw), the number average molecular weight (Mn) and the Z average molecular weight (Mz) in g/mol were analyzed by gel permeation chromatography (GPC). Polydispersity index was calculated by Mw/Mn. Around 8 mg of sample was dissolved in 8 ml of 1,2,4-trichlorobenzene at 160° C. for 90 min. Then the sample solution, 200 µl, was injected into the high temperature GPC with IR5, an infared detector (Polymer Char, Spain) with flow rate of 0.5 ml/min at 145° C. in column zone and 160° C. in detector zone. The data was processed by GPC One® software, Polymer Char, Spain.

Intrinsic Viscosity (IV)

The test method covers the determination of the dilute solution viscosity of HDPE at 135° C. or Ultra High Molecular weight Polyethylene (UHMWPE) at 150° C. The polymeric solution was prepared by dissolving polymer in Decalin with 0.2% wt/vol stabilizer (Irganox 1010 or equivalent). The details are given for the determination of IV followed ASTM D2515.

Crystallinity: The crystallinity is frequently used for characterization by Differential Scanning calorimetry (DSC) follow ASTM D 3418. Samples were identified by peak temperature and enthalpy, as well as the % crystallinity was calculated from the peak area.

Comonomer content: Quantitative $^{13}$C-NMR was used to determine the comonomer content in polyethylene copolymer. The characteristic signals corresponding to the incorporation of 1-butene and/or 1-hexene were identified and calculated to obtain the amount of comonomer in the polymer.

Charpy impact strength: Charpy impact strength is determined according to ISO179 at 23° C., 0° C. and −30° C. and showed in the unit kJ/m$^2$.

Flexural Modulus: The specimen was prepared and performed the test according to ISO178. The flexural tests were done using a universal testing machine equipped with three point bending fixture.

Eta747: The viscosity at shear stress 747 Pa was performed on DHR-3 controlled stress rotational rheometer from TA instrument. Using parallel plate geometry of 25 mm and measurement Gap 1.8 mm. The sample was melt in Compression molding at 190° C. for 5 minutes. The creep stress 747 Pa was applied to sample under nitrogen at 190° C. The strain deformation (γ) was monitored in the function of time. Eta747 was calculated from strain deformation at equilibrium creep time.

Accelerated Creep Test (ACT): The test is performed by HESSEL Ingenieurtechnik GmbH following the PAS1075 standard and expressed the result time in hour (h).

EXPERIMENTAL AND EXAMPLES

The medium or high density polyethylene preparation was carried out in three reactors in series. Ethylene, hydrogen, hexane, catalyst and TEA (triethyl aluminum) co-catalyst were fed into a first reactor in the amounts shown in Table 1. A commercial available Ziegler-Natta catalyst was used. The catalyst preparation is for example described in Hungary patent application 08 00771r. The polymerization in first reactor was carried out to make a low molecular weight polyethylene or medium molecular weight polyethylene. All of polymerized slurry polymer from first reactor was then transferred to a hydrogen removal unit to remove unreacted gas and some of hexane from polymer. The operating pressure in the hydrogen removal unit was be varied in a range of 100 to 115 kPa (abs) where residual hydrogen was removed more than 98% by weight but not more than 99.8% by weight from hexane before transferring to a second polymerization reactor. Some fresh hexane, ethylene and/or comonomer were fed into second reactor to produce first high molecular weight polyethylene (HMW1). All of polymerized polymer from second reactor was fed into the third reactor which produce second high molecular weight polyethylene (HMW2). Ethylene, comonomer, hexane and/or hydrogen were fed into the third reactor.

Comparative Example 1 (CE1)

A homopolymer was produced in first reactor to obtain a low molecular weight portion before transferring such polymer to hydrogen removal unit. Reactant mixture was introduced into the hydrogen removal unit to separate the unreacted mixture from the polymer. Residual hydrogen was removed 97.6% by weight when hydrogen removal unit was operated at pressure of 150 kPa (abs). The low molecular weight polymer was then transferred to the second reactor to produce a first high molecular weight polymer. Final, produced polymer from second reactor was transferred to the third reactor to create a second high molecular weight polymer. In third, a copolymerization was carried out by feeding 1-butene as a comonomer.

Example 1 (E1)

Example 1 was carried out in the same manner as Comparative Example 1 except that the hydrogen removal unit was operated at pressure of 115 kPa (abs). The residual of hydrogen from first reactor was removed 98.0% by weight. Characteristic properties of these multimodal polymers are shown in Table 2. As it can be seen, an improvement of stiffness-impact balance was observed when the percentage of removed hydrogen residual increased compared with the properties of Comparative Example 1.

Example 2 (E2)

Example 2 was carried out in the same manner as Comparative Example 1 except that the hydrogen removal unit was operated at pressure of 105 kPa (abs). The residual hydrogen from the first reactor was removed to an extend of 99.1% by weight. The operational of hydrogen removal unit under this pressure leads to an expansion of a polymer properties range. As seen in Table 2, a final melt flow rate of E2 was lower than a final melt flow rate of CE1 resulted in an improvement of Charpy impact strength while still maintained the flexural modulus.

Comparative Example 2 (CE2)

Comparative Example 2 was carried out in the same manner as Comparative Example 1 except that the hydrogen removal unit was operated at pressure of 102 kPa (abs). The residual of hydrogen from first reactor was removed to an extend of 99.9% by weight. The operational of hydrogen removal unit under this pressure leads to an expansion of a polymer properties range. As seen in Table 2, the final melt flow rate and a density of CE2 were quite similar to a final melt flow rate and a density of E2. A decay of Charpy impact strength was showed in CE2 compared to E2.

Comparative Example 3 (CE3)

A homopolymer was produced in a first reactor to obtain a low molecular weight portion before transferring the polymer to a hydrogen removal unit. Reactant mixture was introduced into the hydrogen removal unit to separate the unreacted mixture from the polymer. Hydrogen residual was removed to an extend of 97.9% by weight when hydrogen removal unit was operated at pressure of 150 kPa (abs). The low molecular weight polymer was then transferred to a second reactor to produce an ultra high molecular weight polymer. In the second reactor, a copolymerization was carried out by feeding 1-butene as a comonomer. Finally, in-situ bimodal copolymer from second reactor was transferred to a third reactor to create a high molecular weight copolymer portion. Characteristic properties of this multimodal polymers is shown in Table 2. A significant improvement in Charpy impact strength at room temperature could be obtained by decreasing a density of final polymer when co-polymer was produced in both the second and the third reactor.

Example 3 (E3)

Example 3 was carried out in the same manner as Comparative Example 3 except that the hydrogen removal unit was operated at pressure of 105 kPa (abs). The residual of hydrogen from first reactor was removed to an extend of 98.8% by weight. The polymer obtained by this process operation had a melt flow rate of 0.195 g/10 min (5 kg loading) lower than such value obtained from CE3. As seen in Table 2, it revealed an improvement of stiffness-impact balance when the percentage of removed hydrogen residual increases compared with the properties of Comparative Example 3.

Example 4 (E4)

A homopolymer was produced in the first reactor to obtain a medium molecular weight portion before transferring such polymer to hydrogen removal unit. The hydrogen removal unit was operated at pressure of 105 kPa (abs) to separate the unreacted mixture from the polymer. The residual of hydrogen from first reactor was removed to an extend of 98.9% by weight. The medium molecular weight polymer was then transferred to the second reactor to produce a first ultra high molecular weight polymer. Finally, produced polymer from second reactor was transferred to the third reactor to create a second ultra high molecular weight polymer. The second and third reactors are operated under hydrogen depleted polyethylene polymerization. The processable in-situ ultra high molecular weight polyethylene is produced by this process operation leads to an excellent improvement of Charpy impact strength while still maintained the flexural modulus. The conventional UHMWPE with very high IV was known that it was unable to measured MI21. The inventive example E4 with IV of 9 dl/g show good melt flow ability beyond the known art.

Comparative Example 4 (CE4)

A homopolymer was produced in first reactor to obtain a low molecular weight portion before transferring such polymer to hydrogen removal unit. Reactant mixture was introduced into the hydrogen removal unit to separate the unreacted mixture from the polymer. Residual hydrogen was removed 97.6% by weight when hydrogen removal unit was operated at pressure of 150 kPa (abs). The low molecular weight polymer was then transferred to the second reactor to produce a first high molecular weight polymer. Final, produced polymer from second reactor was transferred to the third reactor to create a second high molecular weight polymer. In third, a copolymerization was carried out by feeding 1-butene as a comonomer. As seen in Table 2 and 3, the final melt flow rate of CE4 were quite similar to a final melt flow rate of E5. A decay of charpy impact and flexural modulus were showed in CE4 compared to E5, even it showed lower density of E5.

Example 5 (E5)

Example 5 was carried out in the same manner as Comparative Example 4 except that the hydrogen removal unit was operated at pressure of 115 kPa (abs). The residual of hydrogen from first reactor was removed to an extend of 98.5% by weight. The polymer obtained by this process operation had a melt flow rate of 48 g/10 min (5 kg loading) lower than such value obtained from CE3. As seen in Table 2, it revealed an improvement of stiffness-impact balance when the percentage of removed hydrogen residual increases compared with the properties of Comparative Example 4.

Example 6 (E6)

Example 6 was carried out in the same manner as Example 4 except that the comonomer feeding in the third ultra high molecular weight polyethylene. The polymer produced by this process leads to an excellent improvement of Charpy impact strength while still maintained the flexural modulus. As shown in table 2, the inventive example 6 with IV of 23 dl/g show the high impact strength (one notched impact without break) and flexural modulus as compared to comparative samples, however, the melt flow index is unmeasurable due to high viscosity and high Mw.

TABLE 1

|  | CE1 | E1 | E2 | CE2 | CE3 | E3 | E4 | CE4 | E5 | E6 |
|---|---|---|---|---|---|---|---|---|---|---|
| $W_A$, % | 55 | 55 | 55 | 55 | 45 | 45 | 30 | 50 | 50 | 30 |
| $W_B$, % | 20 | 20 | 20 | 20 | 25 | 25 | 30 | 10 | 10 | 30 |
| $W_C$, % | 25 | 25 | 25 | 25 | 30 | 30 | 40 | 40 | 40 | 40 |
| First reactor | | | | | | | | | | |
| Polymerization type | Homo | Homo | Homo | Homo | Homo | Homo | Homo | Homo | Homo | Homo |
| Temperature, °C. | 80 | 80 | 80 | 80 | 80 | 80 | 80 | 80 | 80 | 80 |
| Total pressure, kPa | 800 | 800 | 800 | 800 | 800 | 800 | 800 | 800 | 800 | 800 |
| Ethylene, g | 1,100.72 | 1,100.70 | 1,100.86 | 1,100.74 | 900.30 | 900.30 | 540.50 | 725.21 | 725.57 | 485.70 |
| Hydrogen, g | 1.62 | 1.62 | 1.55 | 1.55 | 2.97 | 2.99 | 1.34 | 1.13 | 1.13 | 1.23 |
| Hydrogen removal unit | | | | | | | | | | |
| Pressure, kPa (abs) | 150 | 115 | 105 | 102 | 150 | 105 | 105 | 150 | 115 | 105 |
| Hydrogen remove, % | 97.6 | 98.0 | 99.1 | 99.9 | 97.9 | 98.8 | 98.9 | 97.7 | 98.5 | 98.3 |
| Second reactor | | | | | | | | | | |
| Polymerization type | Homo | Homo | Homo | Homo | Copo | Copo | Homo | Copo | Copo | Homo |
| Temperature, °C. | 70 | 70 | 70 | 70 | 70 | 70 | 70 | 80 | 80 | 70 |
| Total pressure, kPa | 250 | 250 | 250 | 250 | 250 | 250 | 400 | 300 | 300 | 400 |
| Ethylene, g | 400.52 | 400.81 | 400.35 | 400.06 | 500.17 | 500.31 | 540.36 | 145.35 | 145.21 | 485.78 |
| Hydrogen, g | 0 | 0 | 0 | 0 | 0 | 0 | 0 | 0 | 0 | 0 |
| 1-butene, g | 0 | 0 | 0 | 0 | 18.84 | 18.91 | 0 | 8 | 8 | 0 |
| Third reactor | | | | | | | | | | |
| Polymerization type | Copo | Copo | Copo | Copo | Copo | Copo | Homo | Copo | Copo | Copo |
| Temperature, °C. | 70 | 70 | 70 | 70 | 70 | 70 | 80 | 80 | 80 | 70 |
| Total pressure, kPa | 400 | 400 | 400 | 400 | 400 | 400 | 600 | 600 | 600 | 600 |
| Ethylene, g | 500.74 | 500.11 | 500.30 | 500.63 | 600.02 | 601.19 | 720.60 | 580.53 | 580.46 | 647.54 |
| Hydrogen, g | 0 | 0.001 | 0.001 | 0.001 | 0 | 0.001 | 0 | 0.59 | 1.37 | 0 |
| 1-butene, g | 35.05 | 30.01 | 30.03 | 30.04 | 60.01 | 60.04 | 0 | 27 | 27 | 20.60 |

$W_A$ means percent by weight of Polymer in the first reactor
$W_B$ means percent by weight of Polymer in the second reactor
$W_C$ means percent by weight of Polymer in the third reactor

TABLE 2

|  | CE1 | E1 | E2 | CE2 | CE3 | E3 | E4 | CE4 | E5 | E6 |
|---|---|---|---|---|---|---|---|---|---|---|
| Powder | | | | | | | | | | |
| $MI_5$, g/10 min | 0.474 | 0.372 | 0.240 | 0.242 | 0.275 | 0.200 | — | 54.80 | 48.07 | NA |
| $MI_{21}$, g/10 min | 13.83 | 10.80 | 7.38 | 7.23 | 6.40 | 4.81 | 0.145 | 641 | 653 | NA |
| Density, g/cm³ | 0.9565 | 0.9578 | 0.9555 | 0.9567 | 0.9441 | 0.9438 | 0.9534 | 0.9606 | 0.9590 | 0.9409 |
| IV, dl/g | — | — | — | — | — | — | 9.00 | 1.07 | 1.06 | 23 |
| Mw | 276,413 | 244,279 | 291,295 | 319,487 | 252,160 | 306,468 | 868,813 | 77,334 | 91,752 | 1,269,336 |
| Mn | 8,877 | 8,724 | 8,843 | 8,472 | 8,016 | 7,637 | 24,107 | 5,400 | 6,035 | 23,450 |
| Mz | 2,788,607 | 2,370,678 | 3,401,041 | 4,135,007 | 1,638,224 | 2,643,953 | 5,112,060 | 667,276 | 1,027,956 | 5,262,195 |
| PDI | 31 | 28 | 33 | 38 | 31 | 40 | 36 | 14 | 15 | 54.13 |
| Pellet | | | | | | | | | | |
| $MI_5$, g/10 min | 0.436 | 0.410 | 0.232 | 0.199 | 0.298 | 0.195 | — | 60.62 | 55.47 | — |
| $MI_{21}$, g/10 min | 14.46 | 11.68 | 7.876 | 6.696 | 7.485 | 4.604 | — | 713.1 | 752.2 | — |
| Density, g/cm³ | 0.9577 | 0.9574 | 0.9568 | 0.9566 | 0.9442 | 0.9440 | — | 0.9608 | 0.9594 | — |
| IV, dl/g | 2.97 | 3.03 | 3.52 | 3.64 | 3.12 | 3.37 | 9.00 | 1.0 | 1.1 | 23 |
| % Crystallinity, % | 64.70 | 67.24 | 64.78 | 66.16 | 57.49 | 54.05 | 68.23 | 69.52 | 65.64 | 58.20 |
| Charpy, 23° C., kJ/m² | 23.5 | 29.9 | 35.3 | 30.5 | 47.9 | 50.9 | 84.4 | 1.5 | 1.8 | 85.41 |
| Flexural modulus, MPa | 1,130 | 1,210. | 1,123 | 1,123 | 727 | 785 | 1,109 | 1,147 | 1,196 | 890 |

Pipe-Related Examples

The obtaining multimodal PE product from the third reactor was dried and the resulting powder sent to a finishing operation where it was compounded with carbon black 2-2.5 wt % in extruder at 200° C. under nitrogen atmosphere with 2000 ppm Ca/Zn stearate and 3000 ppm hindered phenol/phosphate stabilizers and, then, pelletized. Density and MI were obtained using the pelletized resins.

Plastic pipe is produced by extruding molten polymer through an annular die. The pipe is formed by passing the molten extrudate through a sizing sleeve and then to a cooling tank where water is sprayed on the outer surface. Solidification proceeds from the outer surface radially inward.

Polymerization conditions and polymer properties are shown in Table 3-4, respectively. Testing results and analysis were applied and recorded on the compound.

Table 3. Polymerization condition of Inventive examples and Comparative examples.

All Inventive examples (Inventive) 7, 8, 9, 10 and comparative example (Comparative) 5, 6, 7 were synthesized by multimodal technology following process patent described above. The polymer composition was described in Table 4.

The composition and properties of polymer were adjusted by split ratio, MI, density and comonomer content upon varying the polymerization conditions. For sample Comparative 4 and Comparative 5, the polymer were produced without comonomer feeding at the $2^{nd}$ reactors to obtain ultra-high molecular weight homopolymer. 1-Butene comonomer was added only in the $3^{rd}$ reactor.

1-Butene comonomer was added both $2^{nd}$ and $3^{rd}$ reactor to obtain copolymer in ultra high molecular weight part for sample Inventive 7, 8, 9, 11 and Comparative 7. GPC results of sample Comparative 5 and Comparative 6 containing homopolymer in $2^{nd}$ reactor prototypes show higher range in Mw for more than 300,000 g/mol and Mz up to 3,500,000 g/mol that confirmed the increasing ultra high molecular weight part by controlling comonomer content in the $2^{nd}$ reactor. Moreover, the excellent in sagging resistance observed by Eta 747 of Comparative 6 also support the effect of UHMW.

Inventive 5-8 show high charpy impact resistance at 23° C., 0° C. and −30° C. according to the inventive process for multimodal polymerization. Moreover with specific multimodal polyethylene composition, Inventive 9 and Inventive 11 also provide higher SCG from ACT results than Comparative 7. The improved balance of SCG with excellent in RCP from multimodal polyethylene composition was proposed in this invention.

TABLE 3

Polymerization condition of Inventive examples and Comparative examples.

| Property | Unit | Comparative 5 (CE5) | Comparative 6 (CE6) | Inventive7 (E7) | Inventive8 (E8) | Inventive9 (E9) | Comparative 7 (CE7) | Inventive10 (E10) | Inventive 11(E11) |
|---|---|---|---|---|---|---|---|---|---|
| $1^{st}$ Reactor | | | | | | | | | |
| Split ratio | % | 52-54 | 48-50 | 51-53 | 55-57 | 55-57 | 59-60 | 57-58 | 55-57 |
| Temperature | ° C. | 81-85 | 81-85 | 81-85 | 81-85 | 81-85 | 81-85 | 81-85 | 81-85 |
| Pressure | Bar | 4.0-5.0 | 6.0-7.0 | 5.0-6.0 | 7.0-8.0 | 7.0-8.0 | 7.0-8.0 | 7.0-8.0 | 7.0-8.0 |
| Hexane flow rate | L/h | 61.4 | 64.69 | 76.4 | 70 | 70 | 74.6 | 76.39 | 70 |
| Ethylene flow rate | L/h | 1853.3 | 1490.3 | 2189.3 | 1439.0 | 1439.0 | 1595.4 | 1407.9 | 1439.0 |
| Hydrogen flow rate | NL/h | 143.1 | 2.56 | 352 | 230 | 230 | 176.1 | 352.01 | 230 |
| Catalyst flow rate | g/h | 5.41 | 5.68 | 5.24 | 1.4 | 1.4 | 3.21 | 3.84 | 1.4 |
| $2^{nd}$ Reactor | | | | | | | | | |
| Split ratio | % | 13-15 | 11-12 | 17-19 | 12-13 | 12-13 | 12-13 | 14-15 | 12-13 |
| Temperature | ° C. | 70-75 | 70-75 | 70-75 | 70-75 | 70-75 | 70-75 | 70-75 | 70-75 |
| Pressure | Bar | 1.5-3.0 | 1.5-3.0 | 1.5-3.0 | 1.5-3.0 | 1.5-3.0 | 1.5-3.0 | 1.5-3.0 | 1.5-3.0 |
| Hexane flow rate | L/h | 147.6 | 150.81 | 162.5 | 156.2 | 156.2 | 160.7 | 162.52 | 156.2 |
| Ethylene flow rate | L/h | 1213.2 | 1150.9 | 1891.7 | 1011.0 | 1011.0 | 1046.8 | 1291.1 | 1011.0 |
| Hydrogen flow rate | NL/h | 0 | 0 | 0 | 0 | 0 | 0 | 0 | 0 |
| Comonomer | Kg/h | 0 | 0 | 0.2 | 0.35 | 0.35 | 0.247 | 0.38 | 0.35 |
| Hydrogen removal | % | 98.94 | 98.94 | 98.97 | 98.89 | 98.89 | 98.97 | 98.99 | 98.89 |
| Flash pressure | Bar | 0.050 | 0.051 | 0.048 | 0.055 | 0.055 | 0.048 | 0.046 | 0.055 |
| Comonomer type | — | — | — | Bu-1 | Bu-1 | Bu-1 | Bu-1 | Bu-1 | Bu-1 |
| $3^{rd}$ Reactor | | | | | | | | | |
| Split ratio | % | 33-35 | 38-40 | 29-31 | 32-33 | 32-33 | 27-29 | 28-30 | 32-33 |
| Temperature | ° C. | 70-75 | 70-75 | 70-75 | 70-75 | 70-75 | 70-75 | 70-75 | 70-75 |
| Pressure | Bar | 1.5-3.0 | 1.5-3.0 | 1.5-3.0 | 1.5-3.0 | 1.5-3.0 | 1.5-3.0 | 1.5-3.0 | 1.5-3.0 |
| Hexane flow rate | L/h | 162.9 | 166.22 | 177.9 | 174.3 | 174.3 | 176.1 | 177.92 | 174.3 |

TABLE 3-continued

Polymerization condition of Inventive examples and Comparative examples.

| Property | Unit | Comparative 5 (CE5) | Comparative 6 (CE6) | Inventive7 (E7) | Inventive8 (E8) | Inventive9 (E9) | Comparative 7 (CE7) | Inventive 10 (E10) | Inventive 11 (E11) |
|---|---|---|---|---|---|---|---|---|---|
| Ethylene flow rate | L/h | 1718 | 2085 | 1985 | 1718 | 1718 | 1536 | 1533 | 1718 |
| Hydrogen flow rate | NL/h | 14.1 | 0.3 | 4.02 | 0 | 0 | 0 | 4.02 | 0 |
| Comonomer | Kg/h | 0.6 | 0.87 | 0.43 | 0.65 | 0.65 | 0.596 | 1.13 | 0.65 |
| Comonomer type | — | Bu-1 | Bu-1 | Bu-1 | Bu-1 | Bu-1 | Bu-1 | Bu-1 | Bu-1 |

TABLE 4

Polymer properties of all inventive example and comparative examples.

| Property | Comparative 5 (CE5) | Comparative 6 (CE6) | Inventive7 (E7) | Inventive8 (E8) | Inventive9 (E9) | Comparative 7 (CE7) | Inventive 10 (E10) | Inventive 11 (E11) |
|---|---|---|---|---|---|---|---|---|
| 1st Reactor | | | | | | | | |
| $MFR_2{}^a$ | 118 | 131 | 190 | 166 | 167 | 209 | 354 | 159 |
| 2nd Reactor | | | | | | | | |
| $MFR_2{}^a$ | NA | NA | 1.73 | 2.67 | 2.67 | 4.126 | 0.7 | 2.12 |
| 1-butene Content | — | — | 0.75 | 0.7 | 0.73 | 0.51 | 0.69 | 0.75 |
| 3rd Reactor (Black compound) | | | | | | | | |
| Density$^b$ | 0.96 | 0.958 | 0.958 | 0.958 | 0.955 | 0.9577 | 0.9553 | 0.9551 |
| $MFR_5{}^b$ | 0.16 | 0.17 | 0.22 | 0.21 | 0.208 | 0.243 | 0.184 | 0.224 |
| 1-butene Content | 0.56 | 0.91 | 1.1 | 1.1 | 1.12 | 0.92 | 1.07 | 1.02 |
| Crystallinity | 59.17 | 59.68 | 58.72 | 58.54 | 52.96 | 57.53 | 60.89 | 54.8 |
| Mw | 377,280 | 331,369 | 284,836 | 257,759 | 280,351 | 164993 | 283446 | 257732 |
| Mn | 11,647 | 12,763 | 13,408 | 13,155 | 13,326 | 6326 | 14265 | 16396 |
| Mz | 3,512,509 | 3,564,780 | 2,531,713 | 1,606,797 | 2,046,490 | 1816088 | 2886126 | 1553902 |
| PDI | 32.39 | 25.96 | 21.24 | 19.59 | 21.04 | 26.08 | 19.87 | 15.72 |
| Eta747 | NA | 1168 | NA | 804 | 721 | 856 | 778 | 604 |
| ACT | NA | NA | NA | NA | 151 | 29.5 | 243 | NA |
| Charpy impact (23° C.) | 26.3 | 31.45 | 35.7 | 49.92 | 33.33 | 23.29 | 34 | 39.91 |
| Charpy impact (0° C.) | 23 | 27.4 | 28.7 | 29.3 | 28.16 | 16.9 | 28.46 | 28.6 |
| Charpy impact (−30° C.) | 19.2 | 13.32 | 27.8 | 22.3 | 14.19 | 10.23 | 21.05 | 20 |

The features disclosed in the foregoing description and in the claims may, both separately and in any combination, be material for realizing the invention in diverse forms thereof.

The invention claimed is:

1. A multimodal polyethylene composition made by a process for producing the multimodal polyethylene composition in a reactor system, the reactor system comprising:
(a) a first reactor;
(b) a hydrogen removal unit arranged between the first reactor and a second reactor comprising at least one vessel connected with a depressurization equipment, the depressurization equipment allowing to adjust an operating pressure to a pressure in a range of 100-200 kPa (abs);
(c) the second reactor; and
(d) a third reactor, the process comprising:
(a) polymerizing ethylene in an inert hydrocarbon medium in the first reactor in the presence of a catalyst system, selected from Ziegler-Natta catalyst or metallocene, and hydrogen in an amount of 0.1-95% by mol with respect to the total gas present in the vapor phase in the first reactor to obtain a low molecular weight polyethylene having a weight average molecular weight (Mw) of 20,000 to 90,000 g/mol, a density of at least 0.965 g/cm³, and an MI2 in the range from 10 to 1,000 g/10 min, or a medium molecular weight polyethylene having a weight average molecular weight (Mw) of 90,000 to 150,000 g/mol, a density of at least 0.965 g/cm$^3$ and an MI2 in the range from 0.1 to 10 g/10 min;

(b) removing in the hydrogen removal unit 98.0 to 99.8% by weight of the hydrogen comprised in a slurry mixture obtained from the first reactor at a pressure in the range of 103-145 kPa (abs) and transferring the obtained residual mixture to the second reactor;

(c) polymerizing ethylene and optionally $C_4$ to $C_{12}$ α-olefin comonomer in the second reactor in the presence of a catalyst system, selected from Ziegler-Natta catalyst or metallocene, and in the presence of hydrogen in an amount obtained in step (b) to obtain a first high molecular weight polyethylene having a weight average molecular weight (Mw) of 150,000 to 1,000,000 g/mol or a first ultra high molecular weight polyethylene having a weight average molecular weight (Mw) of 1,000,000 to 5,000,000 g/mol in the form of a homopolymer or a copolymer and transferring a resultant mixture to the third reactor; and (d) polymerizing ethylene, and optionally $C_4$ to $C_{12}$ α-olefin comonomer in the third reactor in the presence of a catalyst system, selected from Ziegler-Natta catalyst or metallocene, and hydrogen, wherein the amount of hydrogen in the third reactor is in a range of 0.1-70% by mol with respect to the total gas present in the vapor phase in the third reactor or optionally substantial absence of hydrogen to obtain a second high molecular weight polyethylene having a weight average molecular weight (Mw) of 150,000 to 1,000,000 g/mol or a second ultra high molecular weight polyethylene homopolymer or copolymer having a weight average molecular weight (Mw) of 1,000,000 to 5,000,000 g/mol, the multimodal polyethylene composition comprising:

(A) 30 to 65 parts by weight of the low molecular weight polyethylene having a weight average molecular weight (Mw) of 20,000 to 90,000 g/mol or the medium molecular weight polyethylene having a weight average molecular weight (Mw) of 90,000 to 150,000 g/mol;

(B) 5 to 40 parts by weight of the first high molecular weight polyethylene having a weight average molecular weight (Mw) of 150,000 to 1,000,000 g/mol or the first ultra high molecular weight polyethylene having a weight average molecular weight (Mw) of 1,000,000 to 5,000,000 g/mol; and (C) 10 to 60 parts by weight of the second high molecular weight polyethylene having a weight average molecular weight (Mw) of 150,000 to 1,000,000 g/mol or the second ultra high molecular weight polyethylene having a weight average molecular weight (Mw) of 1,000,000 to 5,000,000 g/mol, wherein (A), (B), and (C) each have a different weight average molecular weight, and wherein a ratio Mw/Mn of the weight average molecular weight Mw of the multimodal polyethylene composition to the number average molecular weight Mn of the multimodal polyethylene composition is from 10 to 60.

2. The multimodal polyethylene composition according to claim 1, wherein the ratio of Mw/Mn is from 17 to 22.

3. The multimodal polyethylene composition according to claim 1, wherein the multimodal polyethylene composition has a weight average molecular weight from 80,000 to 1,300,000 g/mol, measured by Gel Permeation Chromatography.

4. The multimodal polyethylene composition according to claim 1, wherein the multimodal polyethylene composition has a number average molecular weight from 5,000 to 30,000 g/mol, measured by Gel Permeation Chromatography.

5. The multimodal polyethylene composition according to claim 1, wherein the multimodal polyethylene composition has a Z average molecular weight from 1,000,000 to 6,000,000 g/mol, measured by Gel Permeation Chromatography.

6. The multimodal polyethylene composition according to claim 1, wherein the multimodal polyethylene composition has a density of 0.945 to 0.965 g/cm$^3$, according to ISO 1183 and/or a melt flow index $MI_5$ from 0.1 to 60 g/10 min.

7. The multimodal polyethylene composition according to claim 6, wherein the melt flow index $MI_5$ is from 0.15 to 0.3 g/10 min.

8. The multimodal polyethylene composition according to claim 1, wherein the total comonomer content with respect to the total amount of monomer units comprised in the low molecular weight polyethylene, the ultra high molecular weight polyethylene and the high molecular weight polyethylene is from 0.5 to 5% mol.

9. A pipe comprising the multimodal polyethylene composition according to claim 1.

10. A method of using the pipe according to claim 9, the method comprising flowing a fluid through the pipe under a pressure of at least 10.0 MPa or under atmospheric pressure.

11. The multimodal polyethylene composition of claim 1, wherein the hydrogen removal unit of the reactor system in which the composition is produced further comprises a stripping column for the separation of hydrogen and a liquid diluent.

12. The multimodal polyethylene composition of claim 1, wherein the depressurization equipment of the hydrogen removal unit of the reactor system in which the composition is produced further comprises a vacuum pump, a compressor, a blower, and ejector, or a combination thereof.

* * * * *